US008660236B2

(12) United States Patent
Carmi et al.

(10) Patent No.: US 8,660,236 B2
(45) Date of Patent: Feb. 25, 2014

(54) METHOD AND APPARATUS FOR DETECTING LOW AND HIGH X-RAY FLUX

(75) Inventors: Raz Carmi, Haifa (IL); Amir Livne, Zichron Ya'aqov (IL)

(73) Assignee: Koninklijke Philips N.V., Eindhoven (NL)

( * ) Notice: Subject to any disclaimer, the term of this patent is extended or adjusted under 35 U.S.C. 154(b) by 561 days.

(21) Appl. No.: 13/054,506

(22) PCT Filed: Jul. 22, 2009

(86) PCT No.: PCT/IB2009/053185
§ 371 (c)(1),
(2), (4) Date: Jan. 17, 2011

(87) PCT Pub. No.: WO2010/018475
PCT Pub. Date: Feb. 18, 2010

(65) Prior Publication Data
US 2011/0116595 A1   May 19, 2011

Related U.S. Application Data

(60) Provisional application No. 61/088,496, filed on Aug. 13, 2008.

(51) Int. Cl.
*G01N 23/04* (2006.01)
*G01T 1/20* (2006.01)

(52) U.S. Cl.
USPC .............................. 378/19; 250/367

(58) Field of Classification Search
USPC .......... 378/19, 98.8; 250/367, 370.11, 370.09
See application file for complete search history.

(56) References Cited

U.S. PATENT DOCUMENTS

| 5,463,224 A | 10/1995 | Burstein et al. |
| 7,138,632 B2 | 11/2006 | Yamada et al. |
| 7,336,769 B2 | 2/2008 | Arenson et al. |
| 2006/0067472 A1 | 3/2006 | Possin et al. |
| 2006/0124832 A1 | 6/2006 | Harmon et al. |
| 2006/0175529 A1 | 8/2006 | Harmon et al. |
| 2007/0187611 A1 | 8/2007 | Chowdhury et al. |

FOREIGN PATENT DOCUMENTS

| JP | 08327742 | 12/1996 |
| WO | 2008021663 A2 | 2/2008 |

*Primary Examiner* — Irakli Kiknadze

(57) ABSTRACT

A method and apparatus for detecting low and high x-ray densities is provided for use in CT imaging. Two photodetectors, one having a relatively low dynamic range and the other having a relatively high dynamic range, are coupled to the same transducer. The first photodetector may be, for example, a SiPM which is passively quenched.

37 Claims, 3 Drawing Sheets

METHOD AND APPARATUS FOR DETECTING LOW AND HIGH X-RAY FLUX

CROSS REFERENCE TO RELATED APPLICATIONS

Figure 1:
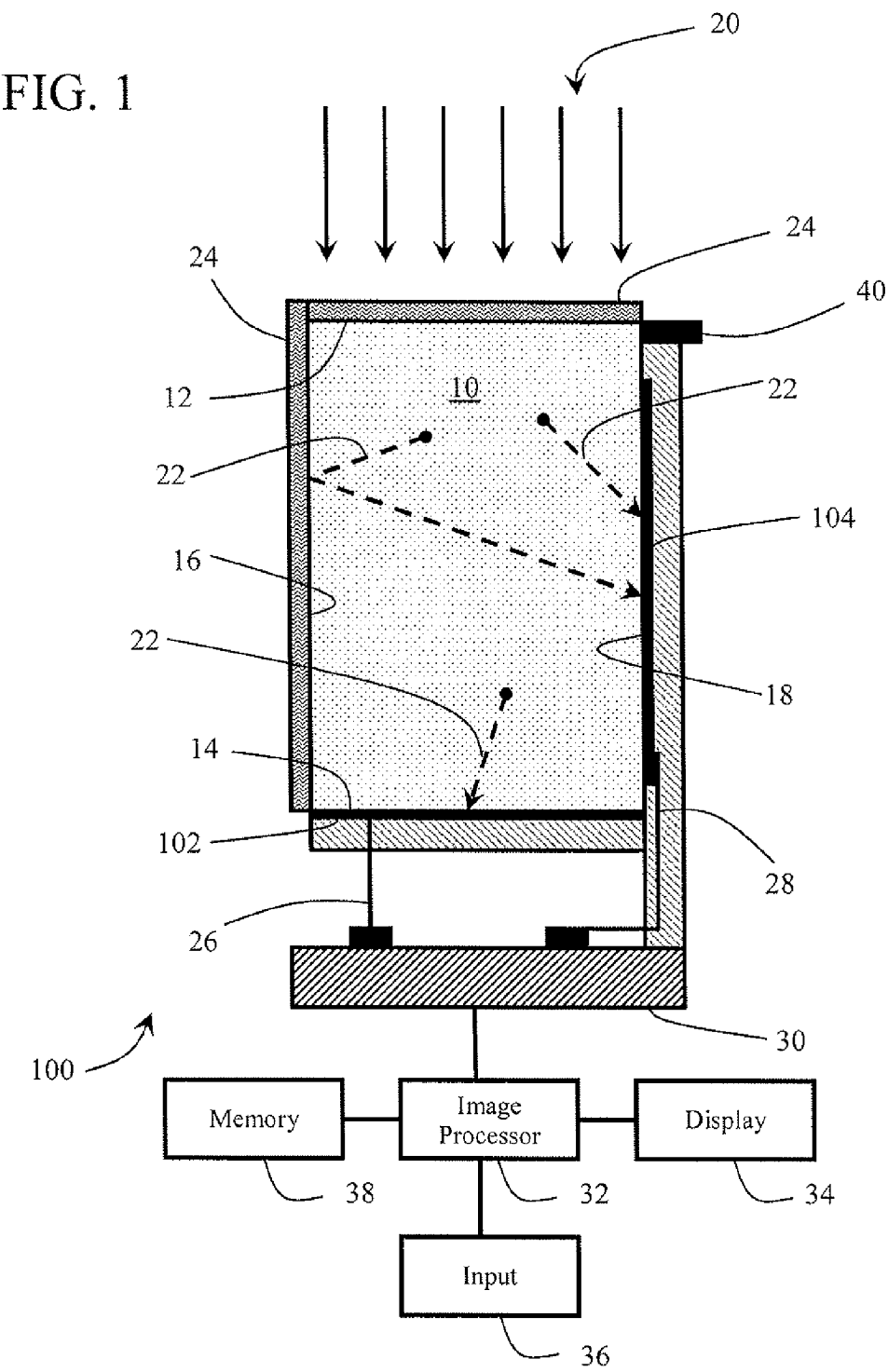

This application claims the benefit of U.S. provisional application Ser. No. 61/088,496 filed Aug. 13, 2008, which is incorporated herein by reference.

The present application relates generally to the imaging arts and more particularly to an x-ray detection method and apparatus. It has application at least in x-ray based imaging systems, especially CT and digital x-ray imaging systems, and will be described with particular reference thereto. However, it may also find application in PET and SPECT imaging, and in other fields.

Computed Tomography (CT) is an imaging modality used in many different contexts, including medical imaging. In CT, an x-ray source disposed externally to an imaged subject produces x-rays which pass at least partially through the subject to be detected by a detector disposed approximately on the opposite side of the subject from the x-ray source. The x-ray source and x-ray detector are often rotated together around the imaged subject to record two dimensional or volumetric x-ray images at different positions or projections around a central axis. The x-ray detector typically interacts with x-rays emitted by the x-ray source to produce electronic signals representative of the x-ray intensity and spectrum received by the detector, corresponding to x-ray projections in a fan wedge or cone geometry. The electronic signals may then be electronically processed to produce a CT image or other three dimensional x-ray based imaged of the subject.

Such x-ray detectors usually include one or more units, usually detector pixels in a pixilated array, each of which has a detection dynamic range. That is, a given x-ray detector unit is useful for reliably measuring x-ray flux between a minimum value and a maximum value. In this context, an "x-ray flux" represents the number of x-ray photons or the total amount of x-ray energy being detected by the x-ray detector unit within a given period of time. Electronic noise and other effects make measurements below the minimum value of an x-ray detector unit's dynamic range unreliable. At the other end, above the maximum value of an x-ray detector unit's dynamic range, the unit becomes overly saturated and cannot keep up with the amount of x-rays being detected, again making measurement unreliable. The dynamic range of a particular x-ray detector unit depends upon, for example, the scintillator, the photodetector, the electronics, and the like. These factors may be varied to design an x-ray detector unit or units having an appropriate dynamic range for a given application.

Known x-ray detector units used in CT imaging have a wide effective dynamic range for applications involving medium to high x-ray flux. The low-end limit to the effective dynamic range of such known x-ray detector units is about 500 mean x-ray photons per millisecond (photon/ms), where a mean x-ray photon is considered here to have an energy of 70 keV. All values of photon/ms mentioned herein refer to mean photons. Thus, these known x-ray detector units typically have only very limited capability to detect x-ray flux below about 500 photon/ms. It would be desirable to extend the lower end of the effective dynamic range of an x-ray detector unit for use in CT imaging or other x-ray based imaging. In principle, even a measurement of a single x-ray photon in a reading time period (i.e., a single local projection) is useful for image reconstruction. Therefore it is desirable to try to approach this limit.

The minimum x-ray flux of an x-ray detector unit's dynamic range is determined by several factors. Two such factors are the noise level in the unit and the potential loss of linearity in the response of the unit to x-ray radiation. The noise level in the unit is a combination of the intrinsic Poissonic or "quantum" noise of x-ray photons arriving at the unit, the Poissonic noise of the secondary photons generated by the scintillator, the photodetector dark current, the electronic noise of the components in the system, and perhaps other effects. For reliable x-ray measurements, the recorded x-ray values should be above that noise level, and preferably should be at least about twice that noise level. In known x-ray detector units used in CT imaging, the noise level is equivalent to about 50 to 250 photon/ms. Regarding the potential loss of linearity, known current integration electronics used in CT imaging (e.g. low gain photodiodes and related electronics) have good linearity in a broad dynamic range between medium and high x-ray flux, but typically have a non-linear response at low x-ray flux below about 500 photon/ms.

According to one aspect of the present invention, a method and apparatus are provided for detecting low and high x-ray flux for use in CT imaging. They also find application in digital x-ray detectors.

One advantage is to increase the range of detectable x-ray doses, especially at the lower end. The advantages of generating useful images from a relatively low x-ray dose are readily apparent, in that the subject is exposed to less radiation. This can be particularly useful for example in imaging asymptomatic patients, or young patients, or particularly large patients, or patients who must undergo several recurring imaging sessions for ongoing diagnosis or treatment, and perhaps other kinds of patients. It is also useful in situations where good low contrast resolution is important, such as for example distinguishing white matter from gray matter in brain imaging or distinguishing cancerous tissue from normal tissue. In addition, the ability to detect low x-ray flux can reduce image artifacts and image noise.

Another advantage is the ability, with one x-ray detector, to measure low as well as high x-ray doses for CT imaging. For example, cardiac scans often require a high x-ray flux, achieved with a high x-ray source tube current. Lung scans, on the other hand, may be done with a lower x-ray flux. It is advantageous to be able to perform both cardiac scans (with a high x-ray flux) and lung scans (with a low x-ray flux) with one apparatus.

Numerous additional advantages and benefits will become apparent to those of ordinary skill in the art upon reading the following detailed description of preferred embodiments. The invention may take form in various components and arrangements of components, and in various process operations and arrangements of process operations. The drawings are only for the purpose of illustrating preferred embodiments and are not to be construed as limiting the invention.

Figure 2:
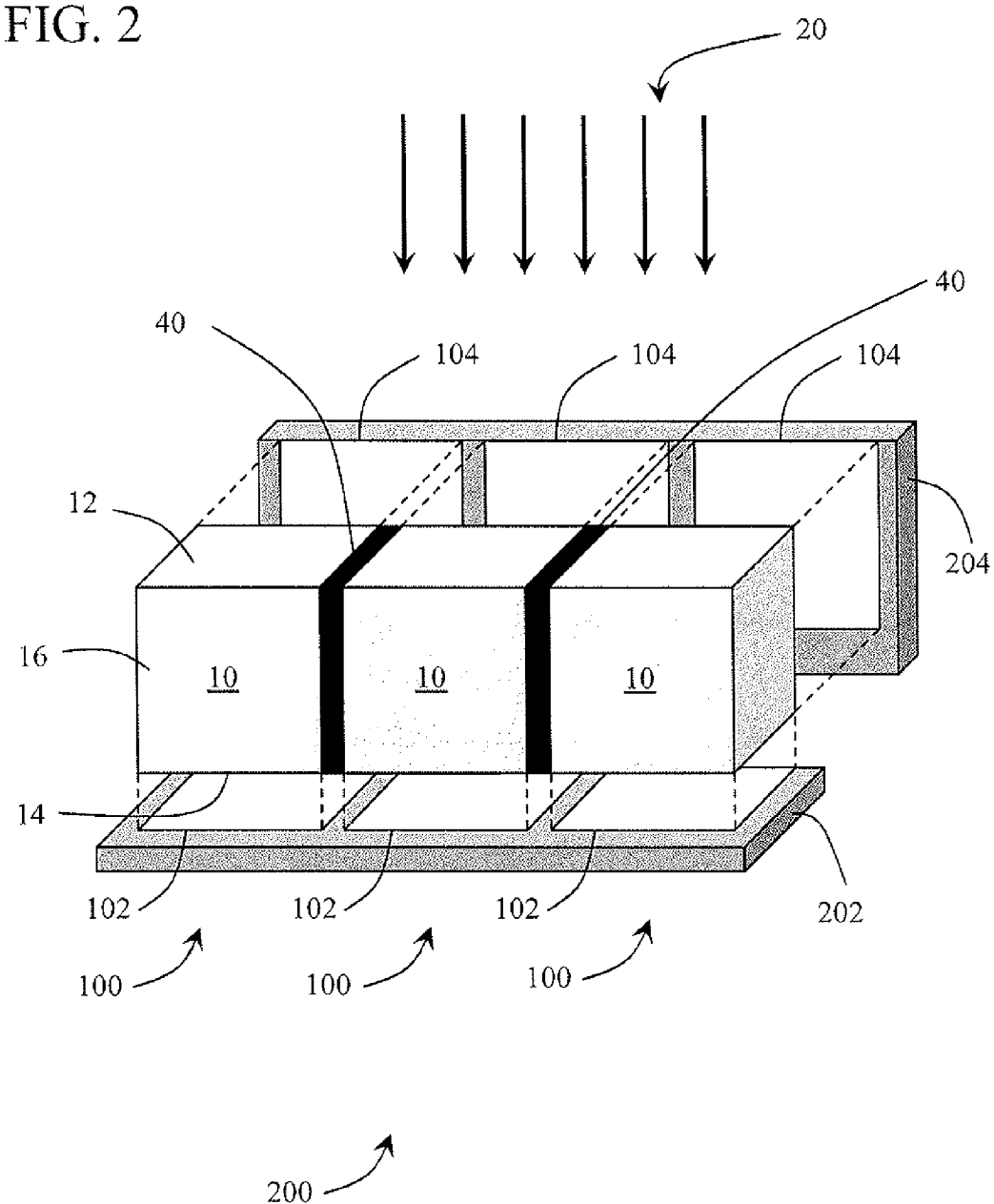
Figure 3:
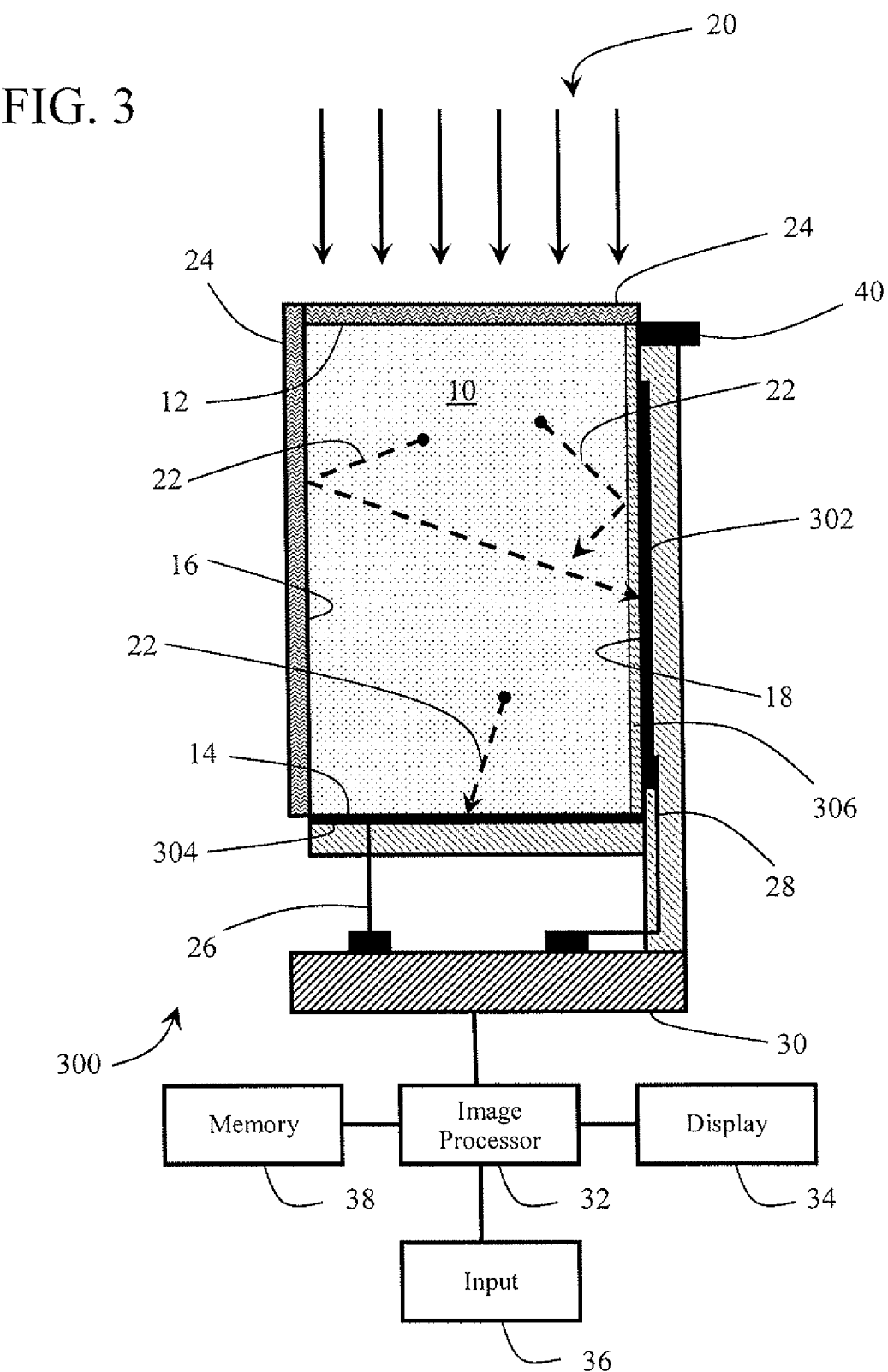

FIG. 1 is a schematic cross-sectional view of an x-ray detector unit 100, not drawn to scale;

FIG. 2 is a schematic perspective view of multiple x-ray detector units 100 combined together to form an array 200, not drawn to scale; and FIG. 3 is a schematic cross-sectional view of an alternative x-ray detector unit 300, not drawn to scale.

The Figures and written description describe exemplary embodiments of x-ray detector units. The Figures are schematic in nature, meant principally for illustration and not as an exact depiction to scale of the elements shown. Therefore, the dimensions of a given element in relation to the dimensions of other elements as shown in the Figures do not necessarily reflect such relative dimensions as one would find in an actual x-ray detector unit. For example, in an actual x-ray detector unit, the reflector material 24 would be much thinner in relation to the size of the scintillator 10 than illustrated in the Figures.

FIG. 1 illustrates a first embodiment of an x-ray detector unit 100. The x-ray detector unit 100 includes a scintillator 10 which, from the perspective of the view in FIG. 1, has a top face 12, a bottom face 14, and four side faces. Only two side faces 16 and 18 are shown in the view of FIG. 1. The relative terms "top", "bottom" and "side" have meaning only from the perspective of FIG. 1 and the other figures in the following description. They do not have any functional significance in the operation of the unit 100. Thus, in particular applications, the unit 100 may be placed in an x-ray based imaging system such that the face 12 is actually a bottom face.

The x-ray detector unit 100 functions to harness incoming x-rays 20 impinging upon the top face 12 and produce an electric signal which is representative of the amount of x-rays 20, or the total x-ray energy. The first step in this process is performed by the scintillator 10, which acts as a transducer by absorbing the energy of the incoming x-rays 20 and converting that energy to secondary photons 22. The amount of secondary photons 22 produced by the scintillator 10 is thus representative of the x-ray energy absorbed within the reading time period.

Many different scintillators are known in the art. Representative scintillators include BGO, CsI, CWO, GOS, GSO, $LaBr_3$, LSO, LYSO, NaI, ZnSe and LuTAG, and there are others. The demands of a particular application may render one or more scintillator(s) particularly suitable or particularly unsuitable for that application. As will be understood from the following description, the response time of the scintillator 10 used in the unit 100 may be relatively slow. For example, in response to absorbing a single x-ray photon, the scintillator 10 may emit secondary photons 22 with a primary decay time of longer than about 1 micro-second. Gadolinium oxysulfide (GOS) is believed to be a suitable scintillator for use in the x-ray detector unit 100, and the other embodiments described below. According to published literature, the primary decay time of GOS is about 3 micro-seconds.

The x-ray detector unit 100 includes a first photodetector 102 optically coupled to the bottom face 14 of the scintillator 10 and a second photodetector 104 optically coupled to the side face 18 of the scintillator 10. Such optical coupling may be achieved by a direct contact, or with intervening elements such as for example filters, transparent or semi-transparent layers, transparent or semi-transparent adhesive, light guides, and the like. The photodetectors 102 and 104 absorb the energy of secondary photons 22 produced by the scintillator 10 and convert that energy to an electrical signal. The electrical signals produced by the photodetectors 102 and 104 are representative of the amount of secondary photons 22 impinging upon the photodetectors 102 and 104, and thus are also representative of the x-ray flux. As described further below, the first photodetector 102 is useful for measuring low x-ray flux, while the second photodetector 104 is useful for measuring high x-ray flux.

The scintillator 10 is covered with a reflector material 24 on each portion of its exterior other than the regions where the photodetectors 102 and 104 are optically coupled to the scintillator 10. The reflector material 24 reflects optical photons such as the secondary photons 22, but permits x-ray photons 20 to pass through unaffected. Thus, the secondary photons 22 must exit the scintillator 10 (if they exit at all) through the photodetectors 102 and 104 (except some small loss). Some secondary photons 22 will be self-absorbed by the scintillator 10 before they can reach a photodetector 102 or 104, and some may escape through or around the reflector material 28.

The first and second photodetectors 102 and 104 respectively have electrical leads 26 and 28 connecting the photodetectors 102 and 104 to a circuit board 30. The circuit board 30 receives electrical signals from the photodetectors 102 and 104 through those leads 26 and 28 and passes them on to signal processing hardware and further on to an image processor 32.

The image processor 32 processes electrical signals received from several different x-ray detector units 100 to form an x-ray based image of a subject according to a mathematical algorithm or algorithms. The image can be displayed on an associated display 34. A user input 36 may be provided for a user to control the image processor 32. The image processor 32 may store related imaging data and other data in a memory 38.

The aforementioned functions and other functions described below can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory such as memory 38, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic shown and described herein preferably resides in or on a computer readable medium such as the memory 38. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

The first photodetector 102 of the x-ray detector unit 100 is configured to detect secondary photons 22 produced by a low x-ray flux. Preferably the minimum x-ray flux of the dynamic range of the first photodetector 102 is below about 250 photon/ms, is more preferably below about 100 photon/ms, and is most preferably below about 50 photon/ms. A representative dynamic range for a suitable first photodetector 102 is about 15 to 1500 photon/ms (with dark noise equivalent to about 7 photon/ms). Such devices are known and include, for example, silicon photomultipliers (SiPMs) also called single photon avalanche diodes (SPADs) or multi-cell Geiger mode avalanche photodiodes (GAPDs), linear avalanche photodiodes (LADs), photomultiplier tubes, and other photodetectors.

In a preferred embodiment, the first photodetector 102 is a SiPM. In general, a SiPM includes many small parallel photosensitive cells (or sub-pixels) which are grouped together into pixels. For example, one pixel can include about 1000 cells. Each photosensitive cell is operated in Geiger mode, where the bias voltage is greater than the breakdown threshold. Due to the high electric gain of such a cell, a single secondary photon 22 absorbed by the cell can generate a temporary avalanche in the cell causing it to deliver a constant and significant amount of charge to the readout electronics 30. Because the cells are operated in Geiger mode, absorption of one secondary photon 22 will produce the same amount of charge as absorption of several secondary photons 22 before the cell is reset by quenching. A representative example of one suitable SiPM is Hamamatsu Photonics Model MPPC Series S10362-11.

In another preferred embodiment, the first photodetector 102 is a photodiode with readout electronics which are optimized for low signals, in the range of about 15 to 1500 photon/ms. For example, the readout electronics may be configured for high gain, which improves the linearity of the photodetector response for low signals, but limits the overall dynamic range at the upper end.

The first photodetector 102 may be operated in signal integration mode or signal counting mode. In signal integration mode, the readout electronics 30 of the photodetector 102 integrate the energy produced by the x-rays 20 which impinge upon the transducer 10 within a given period of reading time, and produce an electrical signal which is representative of that total integrated energy. The reading time of a typical photodetector used in CT imaging often ranges somewhere between about 100 to 400 μsecs, and is often 200 μsecs. The photodetector electronics 30 usually integrate varying charge, current or voltage over that reading time period in signal integration mode. In signal counting mode, by contrast, the photodetector electronics 30 count how many x-rays 20 impinge upon the transducer 10, and also determine the energy of each x-ray 20. As will be appreciated, signal counting mode is a more complex and more costly process to implement than signal integration mode.

If the first photodetector 102 is a SiPM operated in signal integration mode, then the photodetector 102 may have a slow temporal response and be coupled to a relatively slow transducer 10. Taking a GOS scintillator as a representative transducer 10, common GOS scintillators used in CT imaging generate a secondary photon 22 pulse lasting about 10 to 200 pecs for each harnessed x-ray photon 20. Therefore, the scintillation light pulses of many x-ray photons overlap, making it difficult to distinguish between different x-ray photons. In signal integration mode, the electronics 30 integrate pulses of all SiPM cells during a defined reading period, typically 200 μsecs in common CT, and recovery time of a single cell is on the order of 1 μsec. Thus the secondary photon pulse from the transducer (10 to 200 μsecs) is significantly longer than the individual SiPM cell pulses (1 μsec). As a result, the SiPM cells do not need to have a quick recovery time because the SiPM is not used to distinguish between different x-ray photons. Therefore the SiPM cells can be passively quenched rather than actively quenched. Passive quenching of the SiPM cells is less complicated and less costly to achieve than active quenching. Usually, passive quenching can be performed with a single resistor, while active quenching requires a controlled switching circuit. There is also no need for complicated and costly photon counting electronics 30 to read the information coming from the photodetector 102.

The second photodetector 104 of the x-ray detector unit 100 is configured to detect secondary photons 22 produced by a high x-ray flux, above about 1500 photon/ms, with a broader dynamic range than the first photodetector 102. At x-ray flux exceeding about 1500 photon/ms, the first photodetector 102 is typically overly saturated with too many secondary photons 22 and thus cannot provide useful information. Like the first photodetector 102, the second photodetector 104 may be operated in signal integration mode or signal counting mode. The second photodetector 104 might be, for example, a current integration PIN photodiode operated in signal integration mode.

Returning again to FIG. 1, some of the secondary photons 22 generated in the scintillator 10 by the incoming x-rays 20 will reach the first photodetector 102, and others will reach the second photodetector 104. That is, the total number of secondary photons 22 is divided between the two photodetectors 102 and 104 which simultaneously record data. The detector unit 100 may be configured to apportion the secondary photons 22 between the photodetectors 102 and 104 in any ratio which might be preferred. For example, the height and width of the scintillator 10 may be varied to provide more or less surface area available for the secondary photons 22 to reach the respective detectors 102 and 104. Other parameters may be changed or modifications made to achieve a preferred ratio.

Thus, during the time period that x-rays 20 are being detected, both photodetectors 102 and 104 are recording data simultaneously. That data is collected by the circuit board 30 and passed on to the image processor 32. Typically several units 100 are each passing information to the image processor 32. The image processor 32 then determines whether to use data from the first photodetector 102 of a particular unit 100, the second photodetector 104 of the unit 100, or both photodetectors 102 and 104 of the unit 100, in producing a CT image.

For example, if the x-ray flux at a particular unit 100 is particularly low, the data from the second photodetector 104 of that unit 100 may be dominated by noise. In that event, the data from the second photodetector 104 may be ignored, and the data from the first photodetector 102 used instead. Or, if the x-ray flux at a particular unit 100 is particularly high, the first photodetector 102 of that unit 100 may be overly saturated. In that event, the data from the first photodetector 102 may be ignored, and the data from the second photodetector 104 used instead. On the other hand, the x-ray flux at a particular unit 100 may be in a border region under, at or near the upper limit of the first photodetector's dynamic range and above, at or near the lower limit of the second photodetector's dynamic range. In that event, the data from both photodetectors 102 and 104 of the unit 100 can be weighted together using conventional methods to obtain a smooth and accurate transition between the two data sets.

Turning to FIG. 2, several x-ray detector units 100 may be combined into a column or stick comprising a one-dimensional array 200 to help form an x-ray detector. Some components of the units 100, such as the reflector material 24, are not shown in FIG. 2. Three scintillator pixels 10 and their associated photodetectors 102 and 104 are shown in FIG. 3, but of course the array 200 may have any number of x-ray detector units 100. For easier comparison with FIG. 1, the top face 12, bottom face 14 and a side face 16 are identified for one scintillator 10 in FIG. 2. The orientation of the array 200 with respect to the incoming x-rays 20 is also illustrated.

One convenient way to form the array 200 is to mount the first photodetectors 102 on a single bottom circuit chip 202, and mount the second photodetectors 104 on a single side circuit chip 204. Then the scintillators 10 may be attached to the chips 202 and 204 so as to optically couple the scintillators 10 to their respective photodetectors 102 and 104. In such an embodiment, the chips 202 and 204 functionally replace the circuit board 30 of FIG. 1. Thus, the chips 202 and 204 collect data from their respective photodetectors 102 and 104, and pass the data on to an image processor 32 (not shown in FIG. 2).

To help ensure that each x-ray detector unit 100 counts only the x-rays 20 which impinge upon the top face 12 of that unit 100, an x-ray shielding or reflecting material 40 is placed in the spaces between the top faces 12 of the units 100. An x-ray shielding material 40, such as lead or tungsten, substantially prevents the passage of any x-rays through the shield 40. An x-ray reflecting material 40, such as white paint or plastic, substantially reflects x-rays. As shown in FIG. 1, x-ray shielding or reflecting material 40 may also cover the photodetector 104 coupled to a side face 18 of the scintillator 10.

Multiple one-dimensional arrays 200 may be placed side-by-side to form a two-dimensional array (not shown) of x-ray detector units 100. There are of course many other ways to combine x-ray detector units 100 into arrays or other groupings to form an x-ray detector.

FIG. 3 illustrates a second embodiment of an x-ray detector unit 300. The x-ray detector unit 300 shares many identical components with the x-ray detector unit 100 of FIG. 1, and these components are numbered the same in the two Figures. The x-ray detector unit 300 differs from the unit 100 in that the positions of the first and second photodetectors are switched. That is, the first photodetector 302 in FIG. 3 is optically coupled to the side face 18 of the scintillator 10, and the second photodetector 304 in FIG. 3 is optically coupled to the bottom face 14 of the scintillator 10. The structure and function of the first photodetectors 102 and 302 are otherwise the same, and the structure and function of the second photodetectors 104 and 304 are otherwise the same.

In addition, the x-ray detector unit 300 incorporates a semi-transparent/semi-reflecting (and therefore non-absorbing) layer 306 between the transducer 10 and the first photodetector 302. The semi-transparent layer 306 will reflect some secondary photons 22 away from the first photodetector 302, but will also permit some secondary photons 22 through to enter the first photodetector 302. Such a layer 306 might be formed, for example, by white paint. The thickness of the paint may be varied to adjust the degree of transparency/reflectivity of the layer 306, for example it may be on the order of 10 to 30 μm. Of course, a semi-transparent layer could also be placed between the transducer 10 and the second photodetector 304. Incorporating such semi-transparent layer(s) in the x-ray detector unit 300 can optimize the ratio of secondary photons 22 reaching the respective detectors 302 and 304. Although not shown, such semi-transparent layer(s) may also be used in conjunction with the x-ray detector unit 100 of FIG. 1, or other such units.

The semi-transparent layer 306 can be an advantage, for example, if the height of the transducer 10 is significantly larger than its width. If the first photodetector 302 is a SiPM, then its dynamic range scales linearly with its surface area, so its dynamic range advantageously increases with an increased height. In such a configuration, however, it may occur that too many secondary photons 22 enter the first photodetector 302 rather than the second photodetector 304. The semi-transparent layer 306 prevents that imbalance from occurring, allowing a sufficient number of secondary photons 22 to reach the second photodetector 304 so that it can generate accurate signals.

Several x-ray detector units 300 may be combined together to form x-ray detector arrays in the same way as already described above regarding the units 100, or in any other way.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof. The invention may take form in various components and arrangements of components, and in various steps and arrangements of steps. The drawings are only for purposes of illustrating the preferred embodiments and are not to be construed as limiting the invention.

Having thus described the preferred embodiments, the invention is now claimed to be:

1. A radiation detector unit comprising:
   a transducer which converts the radiation to secondary photons;
   a first photodetector optically coupled to the transducer, having a first detection dynamic range with a minimum radiation flux, and operating to convert at least a portion of the secondary photons to a first electronic signal;
   a second photodetector optically coupled to the transducer, having a second detection dynamic range with a minimum radiation flux, and operating to convert at least a portion of the secondary photons to a second electronic signal;
   wherein the minimum radiation flux of the first dynamic range is less than the minimum radiation flux of the second dynamic range, and
   wherein at least one of the first photodetector and the second photodetector is in a direct path of the radiation.

2. The radiation detector unit of claim 1, wherein the radiation is selected from the group of x-rays and gamma rays.

3. The radiation detector unit of claim 1, wherein the transducer is a scintillator.

4. The radiation detector unit of claim 3, wherein the scintillator includes Gadolinium oxysulfide (GOS).

5. The radiation detector unit of claim 3, wherein the secondary photons produced by the scintillator in response to a single radiation photon are emitted with a primary decay time of longer than about 1 micro-second.

6. The radiation detector unit of claim 1, wherein the first photodetector operates in a signal integration mode, and the second photodetector operates in a signal integration mode.

7. The radiation detector unit of claim 1, wherein the first photodetector is a multi-cell Geiger mode avalanche photodiode or a high-gain photodiode.

8. The radiation detector unit of claim 7, wherein the photodiode comprises photodetection cells which are passively quenched.

9. The radiation detector unit of claim 1, further comprising a circuit board connected to the first and second photodetectors by electrical leads.

10. The radiation detector unit of claim 1, wherein the radiation enters the transducer through a first face of the transducer, the first photodetector is optically coupled to a second face of the transducer which is opposite from the first face, and the second photodetector is optically coupled to a third face of the transducer which is different from the first face and the second face.

11. The radiation detector unit of claim 1, wherein the radiation enters the transducer through a first face of the transducer, the second photodetector is optically coupled to a second face of the transducer which is opposite from the first face, and the first photodetector is optically coupled to a third face of the transducer which is different from the first face and the second face.

12. The radiation detector unit of claim 1, wherein the minimum radiation flux of the first dynamic range is equal to or less than about 250 mean x-ray photons per millisecond.

13. The radiation detector unit of claim 12, wherein the minimum radiation flux of the second dynamic range is equal to or more than about 500 mean x-ray photons per millisecond.

14. The radiation detector unit of claim 1, further comprising a semi-transparent layer disposed between the transducer and at least one of the first photodetector and the second photodetector.

15. An x-ray based imaging system comprising:
   an x-ray detector including one or more x-ray detector units, the one or more x-ray detector units comprising:
      a transducer which converts x-rays to secondary photons;
      a first photodetector optically coupled to the transducer, having a first detection dynamic range with a minimum x-ray flux, and operating to convert at least a portion of the secondary photons to a first electronic signal;
      a second photodetector optically coupled to the transducer, having a second detection dynamic range with a minimum x-ray flux, and operating to convert at least a portion of the secondary photons to a second electronic signal; and
      wherein the minimum x-ray flux of the first dynamic range is less than the minimum x-ray flux of the second dynamic range; and at least one of the first photodetector and the second photodetector is disposed in a direct path of the radiation; and
   a computer readable medium comprising logic to use at least one of the first and second electronic signals of the one or more x-ray detector units to generate an x-ray based image.

16. The imaging system of claim 15, wherein the transducer is a scintillator.

17. The imaging system of claim 15, wherein the secondary photons produced by the scintillator in response to a single x-ray photon are emitted with a primary decay time of longer than about 1 micro-second.

18. The imaging system of claim 15, wherein the first photodetector operates in a signal integration mode, and the second photodetector operates in a signal integration mode.

19. The imaging system of claim 15, wherein the first photodetector is a multi-cell Geiger mode avalanche photodiode or a high-gain photodiode.

20. The imaging system of claim 19, wherein the photodiode comprises photodetection cells which are passively quenched.

21. The imaging system of claim 15, wherein the x-rays enter the transducer through a first face of the transducer the first photodetector is optically coupled to a second face of the transducer which is opposite from the first face, and the second photodetector is optically coupled to a third face of the transducer which is different from the first face and the second face.

22. The imaging system of claim 15, wherein the x-rays enter the transducer through a first face of the transducer, the second photodetector is optically coupled to a second face of the transducer which is opposite from the first face, and the first photodetector is optically coupled to a third face of the transducer which is different from the first face and the second face.

23. The imaging system of claim 15, wherein a minimum x-ray flux of the first dynamic range is equal to or less than about 250 mean x-ray photons per millisecond.

24. The imaging system of claim 23, wherein a minimum x-ray flux of the second dynamic range is about 500 mean x-ray photons per millisecond.

25. The imaging system of claim 15, wherein the one or more x-ray detector units further comprise a semi-transparent layer disposed between the transducer and at least one of the first photodetector and the second photodetector.

26. The imaging system of claim 25, wherein a first semi-transparent layer is disposed between the transducer and the first photodetector, and a second semi-transparent layer is disposed between the transducer and the second photodetector.

27. The imaging system of claim 15, wherein the x-ray based imaging system is a computed tomography imaging system or a digital x-ray imaging system.

28. The imaging system of claim 15, wherein the computer readable medium further comprises logic to determine whether to use the first electronic signal, the second electronic signal, or both the first and second electronic signals, of each of the one or more x-ray detector units to generate an x-ray based image.

29. A method of detecting x-ray radiation, the method comprising:
   converting the x-ray radiation to secondary photons with a transducer;
   converting at least a portion of the secondary photons to a first electronic signal with a first photodetector optically coupled to the transducer, having a first detection dynamic range with a minimum x-ray flux, and
   converting at least a portion of the secondary photons to a second electronic signal with a second photodetector optically coupled to the transducer, having a second detection dynamic range with a minimum x-ray flux;
   wherein the minimum radiation flux of the first dynamic range is less than the minimum radiation flux of the second dynamic range; and
   wherein at least one of the first photodetector and the second photodetector is in a direct path of the radiation.

30. A radiation detector unit comprising:
   a transducer which converts the radiation to secondary photons;
   a first photodetector optically coupled to the transducer, having a first detection dynamic range, and operating to convert at least a portion of the secondary photons to a first electronic signal; and
   a second photodetector optically coupled to the transducer, having a second detection dynamic range different from the first detection dynamic range, and operating to convert at least a portion of the secondary photons to a second electronic signal;
   wherein the unit is configured to apportion the amount of secondary photons between the first photodetector and the second photodetector;
   wherein at least one of the first photodetector and the second photodetector is in a direct path of the radiation.

31. The radiation detector unit of claim 30, wherein the transducer comprises a scintillator having a first area in a first face optically coupled to the first photodetector and a second area in a second face optically coupled to a second photodetector, wherein the first area and second area have magnitudes which are selected to apportion the amount of secondary photons between the first photodetector and the second photodetector.

32. The radiation detector unit of claim 31, wherein the radiation enters the transducer through an entry face of the transducer, the first face of the transducer is opposite from the entry face, and the first face of the transducer is different from the second face.

33. The radiation detector unit of claim 30, further comprising a semi-transparent layer disposed between the transducer and at least one of the first photodetector and the second photodetector.

34. The radiation detector unit of claim 33, wherein a first semi-transparent layer is disposed between the transducer and the first photodetector, and a second semi-transparent layer is disposed between the transducer and the second photodetector.

35. The radiation detector unit of claim 30, wherein a minimum radiation flux of the first detection dynamic range is equal to or less than about 250 mean x-ray photons per millisecond.

36. The radiation detector unit of claim 35, wherein a minimum x-ray flux of the second detection dynamic range is equal to or more than about 500 mean x-ray photons per millisecond.

37. The radiation detector unit of claim 30, wherein the radiation is selected from the group of x-rays and gamma rays.

* * * * *